United States Patent [19]
Yoshida

[11] Patent Number: 5,125,444
[45] Date of Patent: Jun. 30, 1992

[54] PNEUMATIC TIRE GENERATING MUSICAL PATTERN SOUND

[75] Inventor: Masahiro Yoshida, Kodaira, Japan
[73] Assignee: Bridgestone Corporation, Tokyo, Japan
[21] Appl. No.: 294,024
[22] Filed: Jan. 8, 1989
[30] Foreign Application Priority Data Jan. 11, 1988 [JP] Japan ............................... 63-3423

[51] Int. Cl.⁵ .............................................. B60C 11/11
[52] U.S. Cl. ................................................ 152/209 R
[58] Field of Search ........... 152/209 R, 209 A, 209 D

[56] References Cited

U.S. PATENT DOCUMENTS 3,217,776 11/1965 Ellenrieder et al. ........... 152/209 A
4,416,316 11/1983 Clatworthy et al. ........... 152/209 R

FOREIGN PATENT DOCUMENTS 2496562 6/1982 France ............................. 152/209 D
78801 5/1983 Japan ............................... 152/209 D
63206 4/1984 Japan ............................... 152/209 D

*Primary Examiner*—Geoffrey L. Knable
*Attorney, Agent, or Firm*—Sughrue, Mion, Zinn, Macpeak & Seas

[57] ABSTRACT

In a pneumatic tire having at least two ribs in a tread portion, one of these ribs is a basic rib constructed by arranging plural basic pitch elements having the same pitch in the circumferential direction of the tire, and any one of the remaining ribs is a chord rib constructed by arranging plural chord pitch elements having the same pitch in the circumferential direction. In this rib arrangement, the total number of chord pitch elements in the chord rib is a positive integer obtained by counting or emitting a product of a value of $2^{n/12}$ (n: 1-24) and a total number of basic pitch elements in the basic rib, and pattern sound from the basic rib and the chord rib have a consonance relation, whereby the noise from the tire can be reduced.

2 Claims, 6 Drawing Sheets

FIG_3

FIG_6
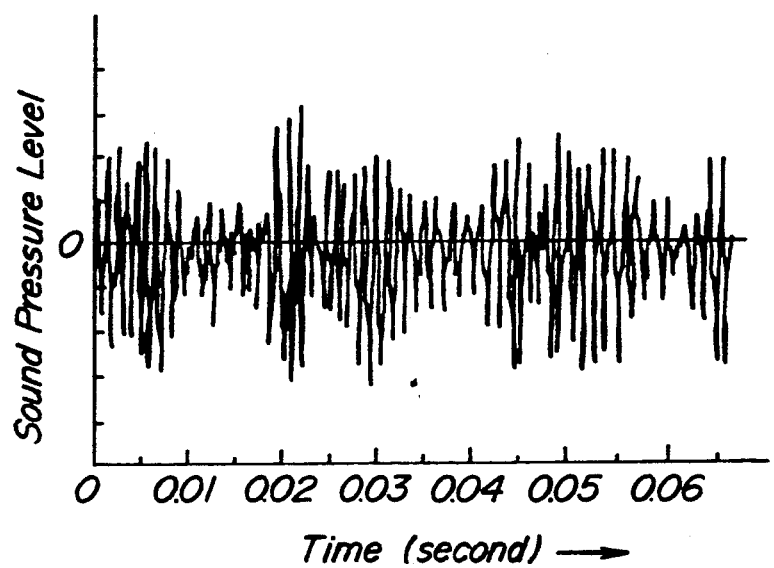
FIG_7
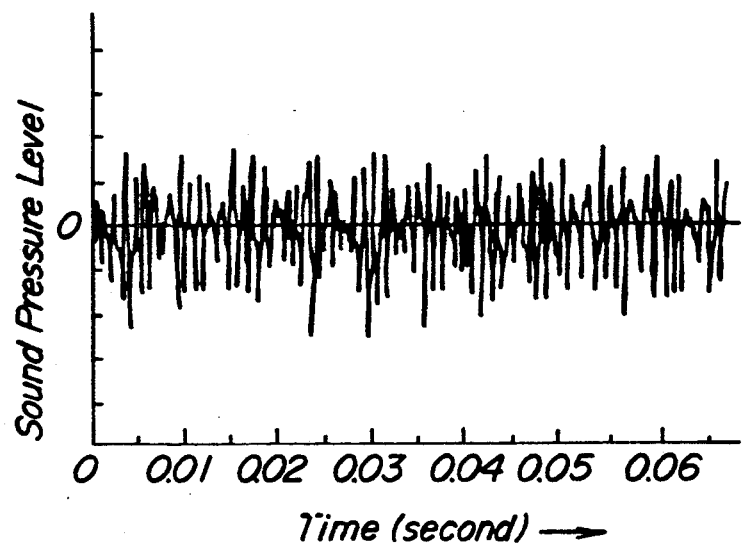

FIG_8
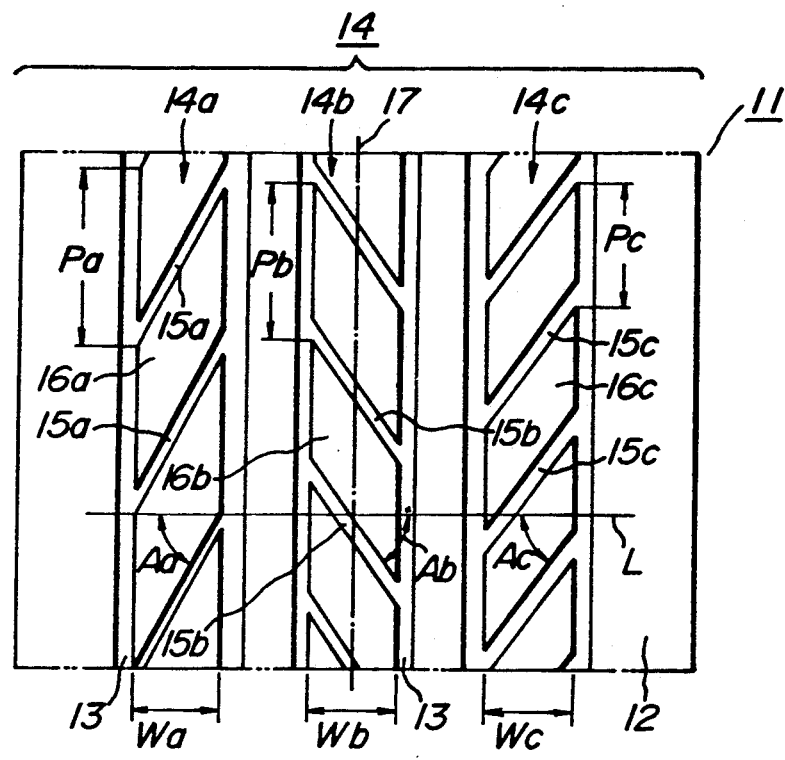
FIG_9
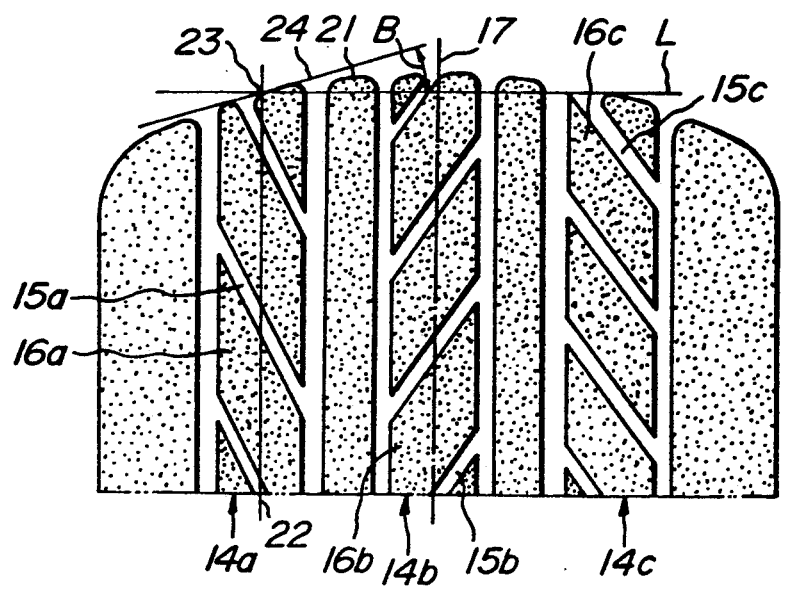

FIG_10
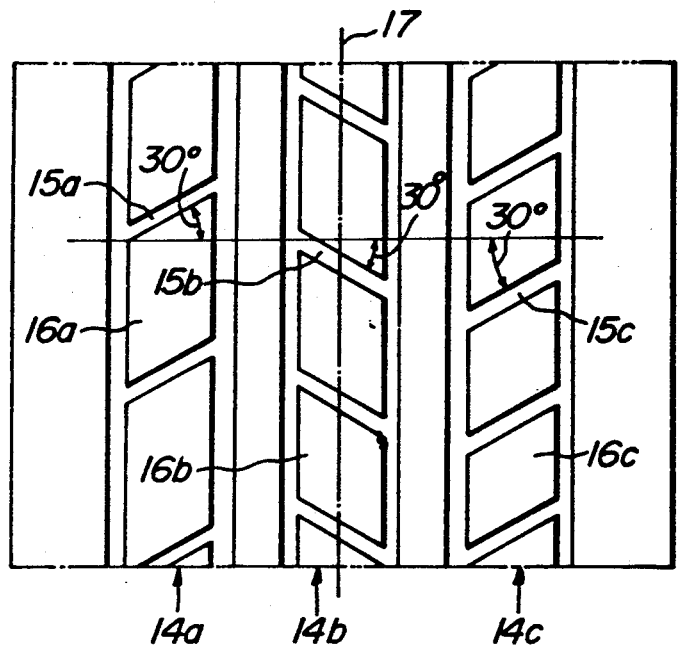
FIG_11
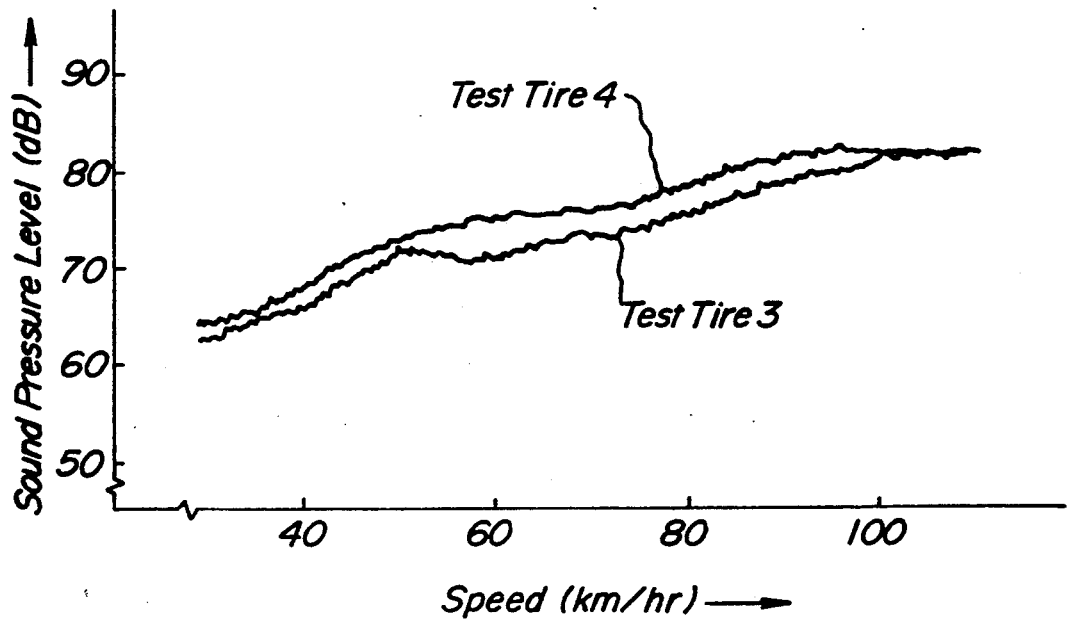

PNEUMATIC TIRE GENERATING MUSICAL PATTERN SOUND

BACKGROUND OF THE INVENTION

1. Field of the Invention

This invention relates to pneumatic tires, and more particularly to an improvement of a tread pattern in such a pneumatic tire.

2. Related Art Statement

Heretofore, there have been proposed various methods for reducing noise generated from a pneumatic tire. For example, it is known to change the pitch of the tread pattern in the circumferential direction of the tire. In this case, plural circumferential ribs arranged in the tread of the tire are constructed by arranging plural pitch groups, for example, three pitch groups A, B and C at a regular order in each of the circumferential ribs in the circumferential direction thereof. Each of the pitch groups is comprised of at least one pitch element such as block having the same pitch length. When the pitch of the tread pattern is changed in the circumferential direction as mentioned above, frequency components of peak orders in ground striking sounds are dispersed to reduce the pattern noise to a significant extent and render it into white noise.

In such a pneumatic tire, however, the different pitch elements repeatedly strike on ground at a regular order during the running, so that the magnitude of output to the tire changes with the lapse of time. Furthermore, when the frequency component order of the ground striking sound generated from one kind of these pitch elements is coincident with the frequency of vibration of normal mode in the tire, such a frequency component is resonantly amplified. Since such amplification is repeated each striking of the above pitch element on ground, amplitude modulation (beats) is produced in the noise. Furthermore, the noise generated from this pneumatic tire is a mixture of various noises, and is offensive to the ear and is uncomfortable.

SUMMARY OF THE INVENTION

It is, therefore, an object of the invention to provide a pneumatic tire sufficiently solving the above problems of the conventional tire.

According to the invention, there is the provision of a pneumatic tire having a tread pattern comprising a basic rib constructed by arranging plural basic pitch elements in the circumferential direction of the tire and at least one chord rib constructed by plural chord pitch elements each having a pitch length different from that of said basic pitch element in the circumferential direction of the tire, characterized in that the total number of said chord pitch elements in each chord rib is an integral value obtained by rounding a product of a value calculated by substituting a positive integer of 1 to 24 into n of $2^{n/12}$ and a total number of basic pitch elements, and that when the pattern sound from said basic rib is corresponded to any sound of 12 scale, the pattern sound from said basic rib has a consonance relation to a pattern sound from a chord rib higher by about n degree from said pattern sound of the basic rib at the above 12 scale.

In a preferred embodiment of the invention, each basic pitch element and the chord pitch element is a block defined by dividing each of the basic rib and the chord rib by plural lateral grooves arranged at an equal interval in the circumferential direction, and an inclination angle A of the lateral groove with respect to a straight line perpendicular to the equator of the tire satisfies the following relation:

$$A = \tan^{-1}(sP/W \pm \tan B)$$

, wherein W is a width of each block, p is a circumferential pitch of each block, s is a positive integer of not more than 3, and B is a crossing angle of a tangent line drawn at an intersect between a stepping-in front edge of a block at ground contact state and a center in widthwise direction of the block with respect to a straight line perpendicular to the equator of the tire.

BRIEF DESCRIPTION OF THE DRAWINGS

The invention will be described with reference to the accompanying drawings, wherein:

FIG. 6 is a graph showing waveform in time of simulation sound from the comparative tire;

FIG. 7 is a graph showing waveform in time of simulation sound from the test tire 1;

FIG. 8 is a partially developed view of a tread portion in a second embodiment of the pneumatic tire according to the invention;

FIG. 9 is a schematic view illustrating a ground contact state of the tread portion for illustrating the inclination angle A;

FIG. 10 is a partially developed view of a tread portion in a test tire 4; and

FIG. 11 is a graph showing results of sound pressure levels in noises measured on test tires 3 and 4.

DESCRIPTION OF THE PREFERRED EMBODIMENTS

According to the invention, the basic rib comprises arranging plural basic pitch elements in the circumferential direction. At least one chord rib is comprised by arranging plural chord pitch elements each having a pitch length different from that of the basic pitch element in the circumferential direction and arranged in the tread portion of the pneumatic tire. The total number of chord pitch elements in each chord rib is an integral value obtained by counting or rounding a product or a value calculated by substituting a positive integer of 1 to 24 into n of $2^{n/12}$ and a total number of basic pitch elements. That is, the basic rib is constructed with plural basic pitch elements having the same pitch length, and the chord rib is constructed with plural chord pitch elements having the same pitch length, when the tire is run on a road, pattern sounds having a particular peak frequency and a different height are generated from the basic rib and the chord rib, respectively, and such a peak frequency is proportional to the total number of the pitch elements in each rib. In the invention, the relation between the total number of basic pitch elements in the basic rib and the total number of chord pitch elements in the chord rib is approximated to the aforementioned relation, i.e. a relation between frequency of any sound in 12 scale and frequency of a sound higher by n degree from the above sound. When the pattern sound from the basic rib is corresponded to any sound in the 12 scale, the pattern sound from the chord rib is a sound higher by about n degree from the pattern sound of the basic rib in the 12 scale. According to the preferred embodiment of the invention, the pattern sounds from the basic and chord ribs satisfy a consonance relation, so that sounds generated from these ribs are mixed to form a consonant interval and consequently pattern sounds from the tire are converted from noise to musical sound to produce a comfort feeling. As mentioned above, each of the ribs is comprised of pitch elements having the same pitch length, so that the change of input to the tire and repetitive amplification through resonance are not caused and the amplitude modulation of the pattern sound can be prevented.

Further, when each of the pitch elements is a block and the inclination angle A of lateral groove defining the block is calculated from $\tan^{-1}$ (sp/W±tan B), a time of striking a part of the block on the ground and a time of striking the other part of the block on ground make a timing of interfering and denying these striking sounds to each other, and consequently the sound pressure level of the pattern sound lowers.

Figure 1:
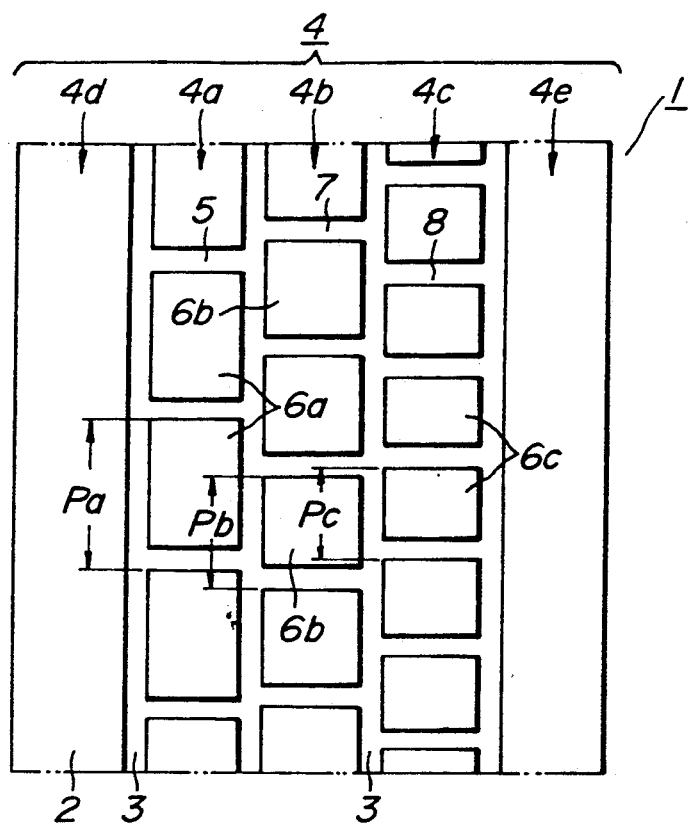
FIG. 1 is a partially developed view of a tread portion in a first embodiment of the pneumatic tire according to the invention.

In FIG. 1 illustrates a first embodiment of the pneumatic tire according to the invention. The pneumatic tire 1 comprises a tread portion 2 divided into plural ribs 4 (five ribs in the illustrated embodiment) extending in the circumferential direction of the tread portion 2 by plural longitudinal grooves 3 (three grooves in the illustrated embodiment) extending in the circumferential direction thereof. Among these ribs 4, a second rib viewed from the left side is a basic rib 4a. In the basic rib 4a, plural lateral grooves 5 (46 grooves in this embodiment) are arranged at an equal interval in the circumferential direction, whereby plural basic pitch elements 6a having the same circumferential pitch Pa or blocks are formed in the basic rib 4a. In this way, the basic rib 4a is constructed by arranging plural basic pitch elements 6a (46 blocks in this embodiment) having the sam pitch in the circumferential direction. Moreover, the term "circumferential pitch P" used herein means a distance from a standard point of any pitch element to a point of a pitch element adjacent to the above pitch element corresponding to the above standard point.

Among the ribs 4, a central rib is a first chord rib 4b, and a second rib viewed from the right side is a second chord rib 4c. In these first and second chord ribs 4b and 4c, plural lateral grooves 7, 8 are formed in the same manner as mentioned above, whereby plural first pitch elements 6b having the same pitch Pb are formed in the first chord rib 4b, and plural second pitch elements 6c having the same pitch Pc are formed in the second chord rib 4c. Thus, each of the first and second chord ribs 4b and 4c is constructed by arranging a plurality of each of first and second chord pitch elements 6b and 6c having the same pitch in the circumferential direction.

The total number of first chord pitch elements 6b in the first chord rib 4b and the total number of second chord pitch elements 6c in the second chord rib 4c are measured to the total number of basic chord pitch elements 6a in the basic rib 4a as follows. That is, a product is determined by multiplying a value obtained by substituting any integer of 1 to 24 into n of $2^{n/12}$ to the total number of basic pitch elements 6a. In this case, values obtained by substituting numerical value of 1 to 24 into n of $2^{n/12}$ are enumerated as follows: 1.06, 1.12, 1.19, 1.26, 1.33, 1.41, 1.50, 1.59, 1.68, 1.78, 1.89, 2.00, 2.19, 2.22, 2.38, 2.52, 2.67, 2.83, 3.00, 3.17, 3.37, 3.56, 3.78 and 4.00. When any sound in the 12 scale is a basic sound, these values are equal to values obtained by dividing frequency of sound higher every 1 degree from the above basic sound in the 12 scale by frequency of the basic sound. In other words, the n-th value is equal to a ratio of frequency of the basic sound. Therefore, assuming that the value of 1.00 is a sound of C in the 12 scale, the above values correspond to C♯, D, D♯, E, F, F♯, G, G♯, A, A♯, and B in the 12 scale in order. In the illustrated embodiment, in order to determine the total number of the first chord pitch elements 6b, when n is 4 from reasons as mentioned below, the value obtained by substituting 4 into n of $2^{n/12}$, i.e. 1.26 is multiplied by the total number of basic pitch elements 6a (46 elements) to obtain a product (57.96 elements), while in order to determine the total number of the second chord pitch elements 6c, when n is 7, the value obtained by substituting 7 into n of $2^{n/12}$, i.e. 1.50 is multiplied by the total number of the basic pitch elements 6a (46 elements) to obtain a product (69 elements). Moreover, the reason why the positive integer of not more than 24 is substituted into n of $2^{n/12}$ is due to the fact that when the value of n is a positive integer of not less than 25, the total number of chord pitch elements in the chord rib becomes considerably large. In other words, the pitch length of each chord pitch element becomes considerably short and the uneven wear and the like are undesirably caused. Then, an integral value is measured by counting or emitting the value of the above product, which corresponds to the total number of chord pitch elements in each chord rib. In this embodiment, the total number of the first chord pitch elements is an integral value of 58 obtained by counting the product (57.96 elements), while the total number of the second chord pitch elements is 69 because the value of the product is an integral value of 69. In the invention, the counting or emitting of product should be performed because the number of the pitch elements never takes a decimal point. In this way, a ratio of total number of basic pitch elements 6a to total number of first chord pitch elements 6b to second chord pitch elements 6c is approximately 1.00:1.26:1.50, so that peak frequencies of pattern sounds generated from the basic rib 4a, first chord rib 4b and second chord rib 4c during the running takes the above ratio. This means that when the peak frequency of sound in the basic rib 4a corresponds to any sound at the 12 scale, the sound generated from the first chord rib 4b is close to a sound higher by n=4 degree from the sound of the basic rib at the 12 scale and the sound generated from the second chord rib 4c corresponds to a sound higher by n=7 degree from the sound of the basic rib at the 12 scale. In order to determine the value to be substituted into n of $2^{n/12}$, sounds of the basic rib 4a, first chord rib 4b and second chord rib 4c are required to satisfy the consonance relation. In this embodiment, when 4 is substituted into n in the first chord rib 4b and 7 is substituted into n in the second chord rib 4c as mentioned above. If the sound from the basic rib 4a corresponds to C at the 12 scale, the sound from the first chord rib 4b is close to E higher from C by n=4 degree and the sound from the second chord rib 4c corresponds to G higher from C by n=7 degree. Therefore these three pattern sounds constitutes a consonance interval of C major as a chord name. As a result, in case of the pneumatic tire 1 having the basic rib 4a, first chord rib 4b and second chord rib 4c in the tread portion 2 as mentioned above, the pattern sounds during the running generate a chord of C major as a whole, which provides a comfortable feeling. Further, each of the basic rib 4a, first chord rib 4b and second chord rib 4c is constructed with each of basic pitch element 6a, first chord pitch element 6b and second chord pitch element 6c each having the same pitch, so that uniform input is always given to the tire 1 and periodical resonance amplification is not caused and hence amplitude modulation (beats) is not caused.

In the illustrated embodiment, the pitch element is not arranged in left side rib 4d located at a most left side and right side rib 4e located at a most right side in the tread portion 2. However, any pitch element may be arranged in each of the left side rib 4d and right side rib 4e. For example, the same pitch element as in the basic pitch element 6a, first chord pitch element 6b or second chord pitch element 6c may properly be arranged in these left side and right side ribs.

As to the consonance relation, there are various examples in addition to the above first embodiment. For instance, the following Tables 1a and 1b show cases that two ribs, i.e. basic rib and chord rib have a consonance relation, respectively, in which the sound from the basic rib is assumed to be C at the 12 scale. Therefore, the difference of n=9 degree at the 12 scale is existent between basic rib and chord rib in Table 1a, and the difference of n=5 degree at the 12 scale is existent between basic rib and chord rib in Table 1b. When two ribs are formed in the tread portion, one of the two ribs is the basic rib and the other rib is the chord rib. Alternatively, when at least three ribs are formed in the tread portion, one of these ribs is the basic rib and any one of the remaining ribs may be the chord rib.

TABLE 1(a)

| Kind of rib | basic | chord |
|---|---|---|
| Total number of pitch elements | 40 | 67 |
| Frequency ratio | 1.00 | 1.68 |
| Scale | C | A |

TABLE 1(b)

| Kind of rib | basic | chord |
|---|---|---|
| Total number of pitch elements | 30 | 40 |
| Frequency ratio | 1.00 | 1.33 |
| Scale | C | F |

The following Tables 2a and 2b show cases that three ribs, i.e. basic rib, first chord rib and second chord rib have a consonance relation ($C_m$, $C_{SUS4}$ as a chord name), respectively, in which the sound from the basic rib is assumed to be C at the 12 scale. In Table 2a, the difference of n=3 degree at the 12 scale is existent between basic rib and first chord rib, and the difference of n=7 degree is existent between basic rib and second chord rib. In Table 2b, the difference of n=5 degree is existent between basic rib and first chord rib, and the difference of n=7 degree is existent between basic rib and second chord rib. When at least three ribs are formed in the tread portion, one of these ribs is the basic rib, and any one of the remaining ribs may be each of first and second chord ribs.

TABLE 2(a)

| Kind of rib | Basic | First chord | Second chord |
|---|---|---|---|
| Total number of pitch elements | 46 | 55 | 69 |
| Frequency ratio | 1.00 | 1.19 | 1.50 |
| Scale | C | D# | G |
| Chord name | | $C_m$ | |

TABLE 2(b)

| Kind of rib | Basic | First chord | Second chord |
|---|---|---|---|
| Total number of pitch elements | 46 | 61 | 69 |
| Frequency ratio | 1.00 | 1.33 | 1.50 |
| Scale | C | F | G |
| Chord name | | $C_{SUS4}$ | |

The following Tables 3a and 3b show cases that four ribs, i.e. basic rib, first chord rib, second chord rib and third chord rib have a consonance relation ($C_{m7}$, $C_9$ as a chord name), respectively, in which the sound from the basic rib is assumed to be C at the 12 scale. In Table 3a, the difference of n=3 degree at the 12 scale is existent between basic rib and first chord rib, the difference of n=7 degree is existent between basic rib and second chord rib, and the difference of n=10 degree is existent between basic rib and third chord rib. In Table 3b, the difference of n=4 degree is existent between basic rib and first chord rib, the difference of n=7 degree is existent between basic rib and second chord rib, and the difference of n=14 degree is existent between basic rib and third chord rib. When at least four ribs are formed in the tread portion, one of these ribs is the basic rib, and any one of the remaining ribs may be each of the first, second and third chord ribs.

TABLE 3(a)

| Kind of rib | Basic | First chord | Second chord | Third chord |
|---|---|---|---|---|
| Total number of pitch elements | 46 | 55 | 69 | 82 |
| Frequency ratio | 1.00 | 1.19 | 1.50 | 1.78 |
| Scale | C | D# | G | A# |
| Chord name | | $C_{m7}$ | | |

TABLE 3(b)

| Kind of rib | Basic | First chord | Second chord | Third chord |
|---|---|---|---|---|
| Total number of pitch elements | 38 | 48 | 57 | 84 |
| Frequency ratio | 1.00 | 1.26 | 1.50 | 2.22 |
| Scale | C | E | G | D |
| Chord name | | $C_9$ | | |

Moreover, there are various consonance relations in addition to the aforementioned relation. For example, there is a relation of A, D, F, G, $A_m$, $D_m$, $A_7$, $G_7$, $A_{m7}$, $D_{m7}$, $C_{dim}$, $C_{aug}$ and $C_{M7}$.

The invention will be described with respect to the following test example 1.

Figure 2:
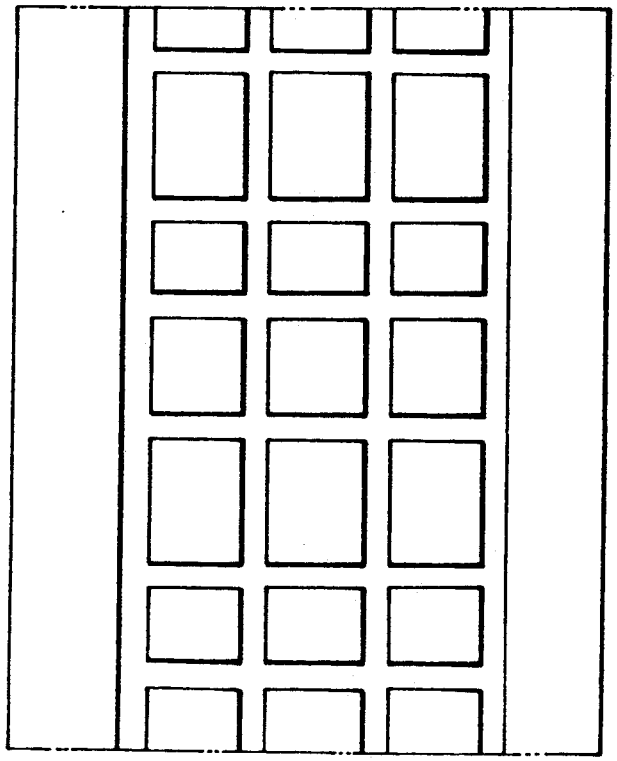
FIG. 2 is a partially developed view of a tread portion in the conventional pneumatic tire.

There are provided three test tires having a tire size of 205/60 R15, in which a first tire is a test tire 1 corresponding to the first embodiment of FIG. 1, a second tire is a comparative tire corresponding to the conventional tire of FIG. 2, and a third tire is a test tire 2 applying the rib structure of Table 2a to the tread pattern of FIG. 1. In these tires, a lateral groove is not formed in the left side rib and right side rib, so that the pitch element (block) is not existent in these ribs. In the comparative tire, each of three ribs located at the central portion of the tread is constructed by repeatedly arranging the basic pitch element 6a, first chord pitch element 6b and second chord pitch element 6c in this order.

Figure 3:
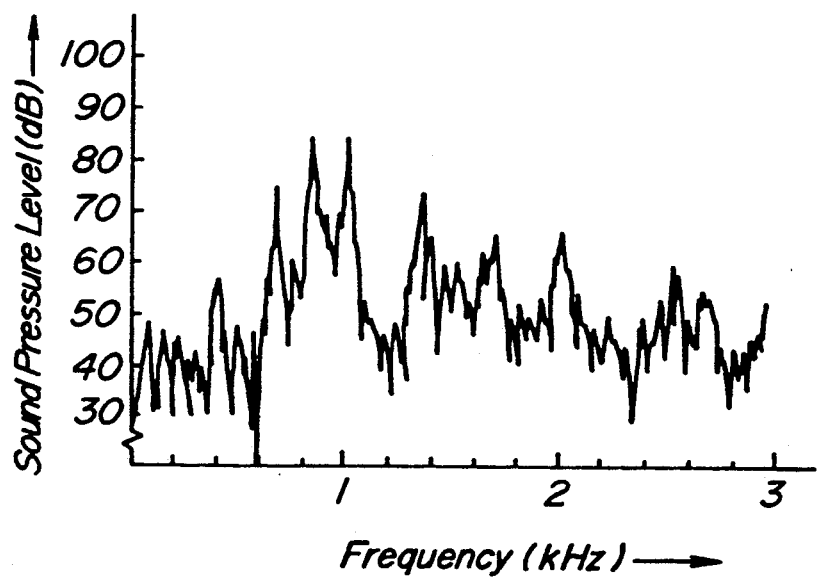
FIG. 3 is a graph showing results of frequency analysis for pattern sound of the tire shown in FIG. 1 as a test tire 1.
Figure 4:
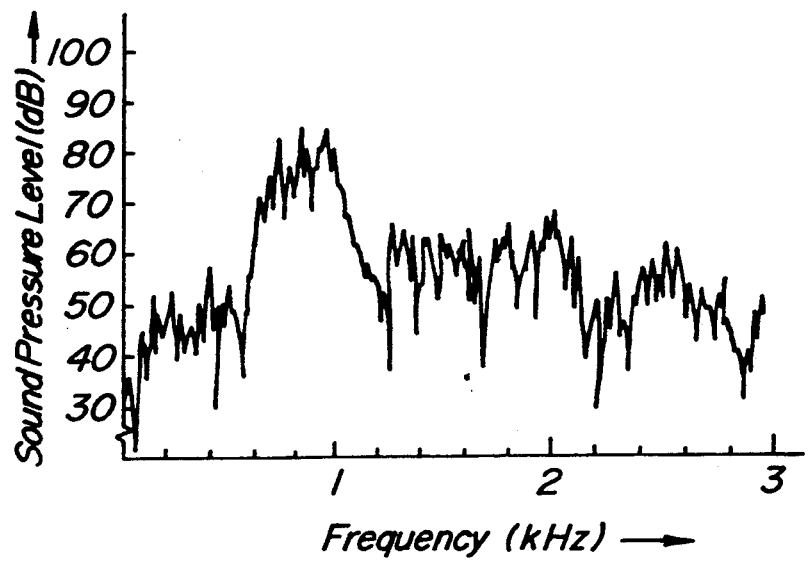
FIG. 4 is a graph showing results of frequency analysis for pattern sound of the tire shown in FIG. 2 as a comparative tire.
Figure 5:
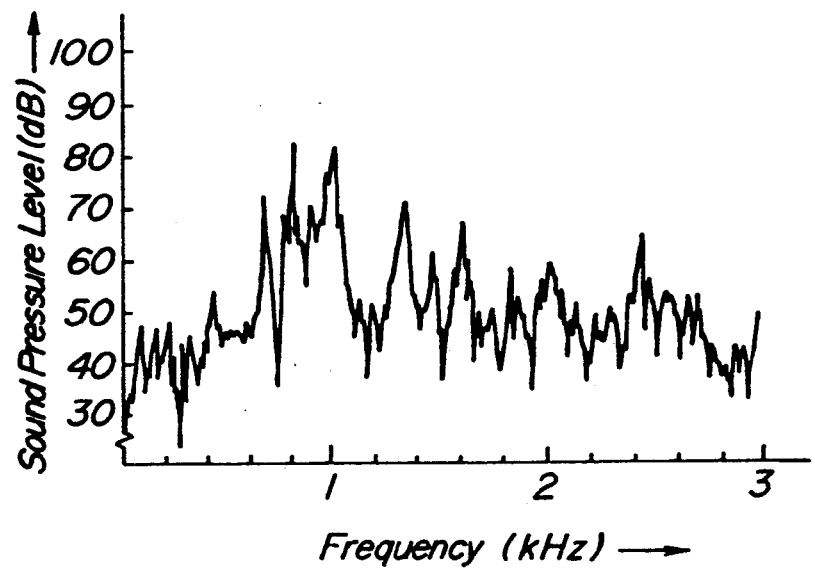
FIG. 5 is a graph showing results of frequency analysis for pattern sound of a test tire 2.

The pattern sounds are generated by simulation process when each of these tires is run at a speed of 100 km/hr, and compared with each other by hearing. As a result, the pattern sounds in the test tires 1 and 2 are very stable and heard as a musical sound, if anything. On the contrary, the sound in the comparative tire is felt to be noisy sound. Further, when these tires are actually run on a drum at 100 km/hr, the pattern sound generated from each tire is the same result as mentioned above. This is clear from results of frequency analysis for the pattern sounds of the test tires 1 and 2 and the comparative tire as shown in FIGS. 3 to 5, wherein FIG. 3 shows a case of the test tire, FIG. 4 shows a case of the comparative tire and FIG. 5 shows a case of the test tire 2. In FIGS. 3 and 5, three peaks are existent in a region of from 0.7 kHz to 1 kHz, and the frequency ratio of these peaks is approximately 1.00:1.26:1.50 in FIG. 3 and 1.00:1.19:1.50 in FIG. 5, so that these peaks form consonance interval to each other. On the other hand, in the comparative tire, the sound pressure levels are approximately equal in the above frequency region as shown in FIG. 4, so that the pattern sound of this tire is heard as noise. Moreover, FIGS. 6 and 7 show waveforms of simulation sounds in the comparative tire and test tire 1 with the lapse of time, respectively. As seen from FIGS. 6 and 7, the sound pressure level or amplitude largely varies in accordance with the repetition of three pitch elements in the comparative tire, while the amplitude modulation is small in the test tire 1 an the sound pressure level becomes low as a whole.

FIG. 8 shows a second embodiment of the pneumatic tire according to the invention. In this tire 11, six longitudinal grooves 13 are formed in a tread portion 12 so as to extend in the circumferential direction of the tread, whereby seven ribs 14 are formed in the tread portion 12. Among these ribs 14, a second rib viewed from left side is a basic rib 14a, and fourth and sixth ribs are first and second chord ribs 14b and 14c, respectively. Further, many lateral grooves 15a, 15b and 15c are formed in these ribs 14a, 14b and 14c at an equal interval in the circumferential direction, respectively, whereby plural basic pitch elements or basic blocks 16a are formed in the basic rib 14a, and plural chord pitch elements or first and second chord blocks 16b and 16c are formed in the first and second chord ribs 14b and 14c, respectively. In this example, the total number of basic blocks 16a constituting the basic rib 14a is 46 likewise the first embodiment, and each of the basic blocks 16a has a width Wa of 24 mm and a circumferential pitch Pa of 42.6 mm. On the other hand, the total number of first chord blocks 16b constituting the first chord rib 14b is 58 approximately equal to a product of the value of 1.26 obtained by substituting 4 into n of $2^{n/12}$ and the total number of basic blocks 16a, and the block 61b has a width Wb of 24 mm and a circumferential pitch Pb of 33.8 mm. Further, the total number of second chord blocks 16c constituting the second chord rib 14c is 69 equal to a product of the value of 1.50 obtained by substituting 7 into n of $2^{n/12}$ and the total number of basic blocks 16a, and the block 16c has a width Wc of 24 mm and a circumferential pitch Pc of 28.4 mm. Thus, peaks of the pattern sounds generated from the first and second chord ribs 14b and 14c are sounds higher from the peak of the pattern sound of the basic rib 14a by n=about 4 degree and n=7 degree at the 12 scale, respectively. If the sound from the basic rib 14a is corresponded to C at the 12 scale, the sounds from the first and second chord ribs 14b and 14c substantially correspond to E and G at the 12 scale, respectively, so that the pattern sound of this tire 11 forms a consonance interval of C major likewise the first embodiment.

In these ribs 14a, 14b and 14c, each of inclination angles Aa, Ab and Ac of the lateral grooves 15a, 15b and 15c with respect to the straight line L perpendicular to the equator 17 of the tire or the axial direction of the tire is equal to a value calculated from the following equation of $\tan^{-1}(sP/W \pm \tan B)$. In this equation, W is a width of each of the blocks 16a, 16b and 16c and is 24 mm in this embodiment as mentioned above. Further, P is a circumferential pitch of each of the blocks 16a, 16b and 16c, and is Pa=42.6 mm, Pb=33.8 mm and Pc=28.4 mm in this embodiment as mentioned above. Moreover, s is any positive integer of not more than 3, and this embodiment is s=1. The reason why s is limited to not more than 3 is due to the fact that when s is not less than 4, the inclination angle A becomes close to 90° and the traction and braking forces during the running considerably lower and the practical use is impossible. Moreover, in the above equation, B is a crossing angle of a tangent line (24) drawn at an intersect (23) between a stepping-in front edge (21) of a block (basic block 16a in the illustrated embodiment) at ground contact state of the tire 11 and a center (22) in widthwise direction of the block with respect to the straight line L perpendicular to the equator (17) of the tire. In this embodiment, the ground contact state is substantially rectangular, so that B is zero. In general, the stepping-in front edge 21 is curved at the ground contact state of the tire 11, so that ±tan B is inserted into the above equation considering the influence of the above curved front edge 21, whereby the difference of stepping-in time between one widthwise end and the other widthwise end of each block 16 is corrected. When the aforementioned values are substituted into the above equation, the inclination angles Aa, Ab and Ac of the lateral grooves 15a, 15b and 15c are 60.6°, 54.6° and 49.8°, respectively. Moreover, the inclination directions of the lateral grooves 15a, 15b and 15c are the same in the basic rib 14a and the second chord rib 14c, and opposite in the first chord rib 14b.

When the tire 11 of the above structure is run on on road, the pattern sounds from the ribs 14a, 14b and 14c form a chord of C major as a whole, which provides a comfort feeling. Further, a time of striking a part of each block (16a, 16b and 16c) on ground and a time of striking the other part of the block on ground make a timing of interfering and denying these striking sounds to each other, and consequently the sound pressure level of the pattern sound lowers as a whole.

The invention will be described with reference to the following test example 2.

There are two test tires having a tire size of 205/60 R15 and a peripheral length of 1960 mm, in which a first tire is a test tire 3 corresponding to the tire of FIG. 8 and a second tire is a test tire 4 having a tread pattern shown in FIG. 11. The structure of the test tire 4 is the same as in the test tire 3 except that all inclination angles A of the lateral grooves 15a, 15b and 15c are 30°. In this case, the inclination angle of A=30° is different from the value calculated from the above equation.

When each of the test tires 3 and 4 is run on a drum, sound pressure levels of noises generated are measured at given speeds to obtain results as shown in FIG. 11. As seen from FIG. 11, the sound pressure level of the test tire 3 is lower than that of the test tire 4 over a whole speed region (40~100 km/hr). And also, the average value of the sound pressure level over the whole speed region is 73.8 dB in the test tire 3 and 75.9 dB in the test tire 4, so that the sound pressure level can be reduced by 2.1 dB in the test tire 3 as compared with the test tire 4. Moreover, when each of the test tires 3 and 4 is mounted on a passenger car and run on good a rood ad a speed of 50 km/hr, the noise generated from the tire is judged by feeling of a driver. As a result, when the feeling index of the test tire 4 is 100, the feeling index of the test tire 3 is 110, so that the test tire provides good results in the feeling test as compared with the test tire 4. Particularly, such a good feeling is obtained at a speed of not more than 60 km/hr.

Although the arrangement of one basic rib and one chord rib is described in the above embodiments, according to the invention, adjoining two or three ribs may be basic rib or chord rib.

As mentioned above, according to the invention, the pattern sound of the pneumatic tire can be converted from noise into musical sound, and also the amplitude modulation of the pattern sound can be reduced.

What is claimed is:

1. A pneumatic tire having a tread pattern comprising; a basic rib constructed by arranging plural basic pitch elements in the circumferential direction of the tire; at least one chord rib constructed by plural chord pitch elements each having a pitch length different from that of said basic pitch element in the circumferential direction of the tire, a total number of said chord pitch elements in each chord rib being an integral value obtained by rounding a product of a value calculated by substituting a positive integer of 1 to 24 into n of $2^{n/12}$ and a total number of basic pitch elements, and when the pattern sound from said basic rib corresponds to any sound of a 12 scale, the pattern sound from said basic rib has a consonance relation to a pattern sound from a chord rib higher by about n degree from said pattern sound of the basic rib at the above 12 scale; wherein each of the basic pitch element and the chord pitch element is a block defined by dividing each of the basic rib and the chord rib by plural lateral grooves arranged at an equal interval in the circumferential direction, and an inclination angle A of the lateral groove with respect to a straight line perpendicular to the equator of the tire satisfies the following relation:

$$A = \tan^{-1}(sP/W \pm \tan B),$$

wherein W is a width of each block, P is a circumferential pitch of each block, s is a positive integer of not more than 3, and B is a crossing angle of a tangent line drawn at an intersect between a stepping-in front edge of each block at ground contact state and a center in widthwise direction of the block with respect to a straight line perpendicular to the equator of the tire.

2. The pneumatic tire according to claim 1, wherein s in said relationship is not more than 2.

* * * * *